(12) United States Patent
Chow

(10) Patent No.: US 7,612,829 B2
(45) Date of Patent: Nov. 3, 2009

(54) 2:2 AND 3:2 PULL-DOWN DETECTION TECHNIQUES

(75) Inventor: Wing-Chi Chow, Toronto (CA)

(73) Assignee: Zoran Corporation, Sunnyvale, CA (US)

( * ) Notice: Subject to any disclaimer, the term of this patent is extended or adjusted under 35 U.S.C. 154(b) by 53 days.

(21) Appl. No.: 11/226,581

(22) Filed: Sep. 13, 2005

(65) Prior Publication Data

US 2006/0012707 A1    Jan. 19, 2006

Related U.S. Application Data

(62) Division of application No. 10/119,999, filed on Apr. 9, 2002, now Pat. No. 7,202,907.

(51) Int. Cl.
*H04N 7/01* (2006.01)
*H04N 11/20* (2006.01)

(52) U.S. Cl. .................. 348/452; 348/448; 348/449

(58) Field of Classification Search ............. 348/441, 348/448, 452, 449, 451, 458, 554–558; *H04N 7/01, H04N 11/20*
See application file for complete search history.

(56) References Cited

U.S. PATENT DOCUMENTS

| 4,486,785 | A |   | 12/1984 | Lasher et al. |
| 4,876,596 | A |   | 10/1989 | Faroudja |
| 4,982,280 | A | * | 1/1991  | Lyon et al. ............... 348/448 |
| 5,291,280 | A |   | 3/1994  | Faroudja et al. |
| 5,398,071 | A |   | 3/1995  | Gove et al. |
| 5,563,651 | A | * | 10/1996 | Christopher et al. ......... 348/97 |
| 5,650,824 | A |   | 7/1997  | Huang |
| 5,684,544 | A |   | 11/1997 | Astle |
| 5,712,687 | A |   | 1/1998  | Naveen et al. |
| 5,852,473 | A | * | 12/1998 | Horne et al. ............... 348/558 |
| 5,886,745 | A |   | 3/1999  | Muraji et al. |
| 6,058,140 | A |   | 5/2000  | Smolenski |
| 6,104,753 | A |   | 8/2000  | Kim et al. |
| 6,133,960 | A |   | 10/2000 | Mendenhall |
| 6,141,056 | A |   | 10/2000 | Westerman |
| 6,157,412 | A |   | 12/2000 | Westerman et al. |
| 6,201,577 | B1 |  | 3/2001  | Swartz |

(Continued)

FOREIGN PATENT DOCUMENTS

JP    H05-183884    7/1993

(Continued)

OTHER PUBLICATIONS

PCT/ISA, "International Search Report" mailed on Oct. 22, 2004 in corresponding PCT/US03/10858, 4 pages.

(Continued)

*Primary Examiner*—M. Lee
(74) *Attorney, Agent, or Firm*—Davis Wright Tremaine LLP

(57) ABSTRACT

Improved 2:2 and 3:2 pull-down detection techniques are presented. These techniques can, for example, be used when converting an interlaced video signal into a progressive video signal. The improved techniques are less susceptible to bad edits. In one embodiment, comparison values are generated using consecutive fields of the interlaced video signal having the same parity, with a sequence of one small comparison value followed four large comparison values, where the four large comparison values include two pairs of similar large comparison values, is used to indicate a 3:2 pull-down.

28 Claims, 4 Drawing Sheets

U.S. PATENT DOCUMENTS

| | | | |
|---|---|---|---|
| 6,208,350 B1 | 3/2001 | Herrera | |
| 6,239,847 B1 | 5/2001 | Deierling | |
| 6,262,773 B1 | 7/2001 | Westerman | |
| 6,295,091 B1 | 9/2001 | Huang | |
| 6,297,801 B1 | 10/2001 | Jiang | |
| 6,377,313 B1 | 4/2002 | Yang et al. | |
| 6,380,978 B1 | 4/2002 | Adams et al. | |
| 6,501,507 B1 | 12/2002 | Canfield | |
| 6,538,658 B1 | 3/2003 | Herrera | |
| 6,559,974 B1 | 5/2003 | Morisita | |
| 6,563,550 B1 | 5/2003 | Kahn et al. | |
| 6,573,940 B1 | 6/2003 | Yang | |
| 6,587,158 B1 | 7/2003 | Adams et al. | |
| 6,647,061 B1 | 11/2003 | Panusopone et al. | |
| 6,680,752 B1 | 1/2004 | Callway et al. | |
| 6,864,923 B2 | 3/2005 | Minami | |
| 7,006,147 B2 | 2/2006 | Willis | |
| 7,035,481 B2 | 4/2006 | Kim et al. | |
| 7,136,417 B2 | 11/2006 | Rodriguez | |
| 7,202,907 B2 | 4/2007 | Chow | |
| 2002/0075400 A1 | 6/2002 | Shin et al. | |
| 2004/0028292 A1 | 2/2004 | Alm et al. | |

FOREIGN PATENT DOCUMENTS

| | | |
|---|---|---|
| JP | 09-322126 | 12/1997 |

OTHER PUBLICATIONS

Office Action for U.S. Appl. No. 10/119,999 mailed Dec. 1, 2005, 9 pages.
Office Action for U.S. Appl. No. 10/119,999 mailed Aug. 10, 2006, 4 pages.
Munsil et al., The Chroma Upsampling Error and the 4:2:0 Interlaced Chroma Problem, Apr. 2001, www.hometheaterhifi.com, pp. 1-20.
Notification of Reasons for Refusal, Japanese Patent Application No. 2003-585418, dated Nov. 4, 2008, 11 pages.
Notification of Reasons for Refusal, Japanese Patent Application No. 2003-585418, dated Jun. 30, 2009, 8 pages.

\* cited by examiner

2:2 AND 3:2 PULL-DOWN DETECTION TECHNIQUES

CROSS REFERENCE TO RELATED APPLICATION

This application is a divisional of application Ser. No. 10/119,999 filed Apr. 9, 2002 now U.S. Pat. No. 7,202,907, which application is incorporated herein in its entirety by this reference.

BACKGROUND

1. Field of the Invention

The present invention relates to video signal processing and, more particularly, to improved 2:2 and 3:2 pull-down detection techniques. The techniques of the present invention can, for example, be used when converting an interlaced video signal into a progressive video signal.

2. Related Art

There are two common types of video display systems: interlaced display systems and progressive display systems. Interlaced display systems use interlaced video signals. An interlaced video signal includes even fields, which contain one half of the total lines displayed on a display, and odd fields, which contain the other half of the total lines displayed on the display. The even fields and the odd fields of the interlaced video signal are alternately scanned onto the display to generate an image. By contrast, progressive display systems use progressive video signals. A progressive video signal includes frames, each of which contains all of the lines displayed on a display. The frames of the progressive video signal are successively scanned onto the display to generate an image.

Progressive display systems are becoming increasingly popular since they produce a higher quality image compared to interlaced display systems. However, many video signals that exist today are interlaced video signals. Thus, to display the interlaced video signals on a progressive display system, the interlaced video signal must be converted into a progressive video signal. This conversion process is known as video deinterlacing and is typically performed by a video deinterlacer circuit. Video deinterlacing is also referred to as line doubling and video deinterlacer circuits are also referred to as line doubler circuits.

Two common video deinterlacing techniques are referred to as the merging technique (also referred to as weaving) and the interpolation technique (also referred to as bobbing). According to the merging technique, the lines of the even and odd fields of an interlaced video signal are weaved (or interleaved) to generate a single frame. The merging technique is well suited for relatively static images, but produces highly objectionable artifacts when significant motion is present in the image. According to the interpolation technique, the interpolated lines (i.e., the missing lines) between the field lines are generated (usually by averaging the field pixels in the field lines above and below each interpolated line) and combined with the field lines to generate a single frame. The interpolation technique is well suited for video with high motion content, but produces a clearly visible loss of vertical resolution for relatively static images. Motion adaptive techniques have been developed so that when there is relatively little motion in an image, the merging technique is used, and when there is a relatively large amount of motion in an image, the interpolation technique is used.

Interlaced video signals can have different field rates, such as 50 fields/second or 60 fields/second, and interlaced video signals can be generated from different sources, such as film, cartoons, computer graphics, or computer animation. Film, which includes 24 frames that are displayed every second, is typically converted into a 50 field/second interlaced video signal using a well-known technique referred to as 2:2 pull-down and is then displayed at a rate 4% faster than the original rate. Film is typically converted into a 60 field/second interlaced video signal using a well-known technique referred to as 3:2 pull-down (also referred to as 2:3 pull-down). Computer animation is often created at 30 frames/second and is converted into 60 interlaced fields/second using 2:2 pull-down.

FIG. 1 illustrates the 2:2 pull-down technique. Using 2:2 pull-down, film frame A is converted into even interlaced video field A1 and odd interlaced video field A2; film frame B is converted into even interlaced video field B1 and odd interlaced video field B2; film frame C is converted into even interlaced video field C1 and odd interlaced video field C2; film frame D is converted into even interlaced video field D1 and odd interlaced video field D2, and so on. Note that it is also possible that film frame A will be converted into odd interlaced video field A1 and even interlaced video field A2, etc. Thus, using 2:2 pull-down together with a 4% speed up, 24 film frames are converted into 50 interlaced video fields every second.

When converting an interlaced video signal into a progressive video signal, it is desirable to determine whether the interlaced video signal was generated using 2:2 pull-down. This is because if the interlaced video signal was generated using 2:2 pull-down, the video deinterlacer can use the merging technique to merge consecutive fields (i.e., fields that were generated from the same film frame such as A1 and A2, B1 and B2, C1 and C2, and so on) to generate an essentially perfect progressive video signal.

Conventional video deinterlacer systems use a 2:2 pull-down field motion detector circuit to determine whether an interlaced video signal was generated using 2:2 pull-down. The 2:2 pull-down field motion detector circuit compares consecutive fields of the interlaced video signal and generates a comparison value for each comparison. If the 2:2 pull-down field motion detector circuit detects a 2:2 pull-down field pattern, then the 2:2 pull-down field motion detector circuit generates a signal that indicates that the interlaced video signal was generated using 2:2 pull-down. As used herein, a 2:2 pull-down field pattern is a repeating sequence of 1 small comparison value followed by 1 large comparison value. Another signal is generated that indicates the 2:2 pull-down sequence. On the other hand, if the 2:2 pull-down field motion detector circuit does not detect a 2:2 pull-down field pattern, then the 2:2 pull-down field motion detector circuit generates a signal that indicates that the interlaced video signal was not generated using 2:2 pull-down. Note that a small comparison value indicates a good correlation between consecutive fields and a large comparison value indicates a poor correlation between consecutive fields. As used herein, a comparison value is the difference between two fields, and a difference value is the difference between two comparison values.

The technique employed by a conventional 2:2 pull-down field motion detector circuit is illustrated by the following example. Suppose that an interlaced video signal has the following field sequence:

A1 A2 B1 B2 C1 C2 D1 D2 E1 E2 F1 F2 G1 G2 . . .

Fields A1 and A2 were generated from film frame A; fields B1 and B2 were generated from film frame B; fields C1 and C2 were generated from film frame C; fields D1 and D2 were generated from film frame D, and so on. The 2:2 pull-down field motion detector circuit compares consecutive fields of the interlaced video signal yielding a repeating pattern of 1 small comparison value followed by 1 large comparison value:

$A1-A2=CV1$ (which is a small difference)

$A2-B1=CV2$ (which is a large difference)

$B1-B2=CV3$ (which is a small difference)

$B2-C1=CV4$ (which is a large difference)

$C1-C2=CV5$ (which is a small difference)

$C2-D1=CV6$ (which is a large difference)

$D1-D2=CV7$ (which is a small difference)

$D2-E1=CV8$ (which is a large difference)

$E1-E2=CV9$ (which is a small difference)

$E2-F1=CV10$ (which is a large difference)

$F1-F2=CV11$ (which is a small difference)

$F2-G1=CV12$ (which is a large difference)

$G1-G2=CV13$ (which is a small difference)

The 2:2 pull-down field motion detector circuit detects the repeating 2-field sequence of 1 small comparison value followed by 1 large comparison value and generates a signal which indicates that the interlaced video signal was generated using 2:2 pull-down. If a repeating 2-field sequence of 1 small comparison value followed by 1 large comparison value is not detected, the 2:2 pull-down field motion detector circuit generates a signal which indicates that the interlaced video signal was not generated using 2:2 pull-down.

The signal that indicates whether or not the interlaced video signal was generated using 2:2 pull-down is then provided to a deinterlacer circuit. If the indication signal indicates that a 2:2 pull-down field pattern has been detected, the deinterlacer circuit uses the merging technique to convert the interlaced video signal into a progressive video signal. On the other hand, if the indication signal indicates that a 2:2 pull-down field pattern has not been detected, the deinterlacer circuit typically uses a motion adaptive technique to convert the interlaced video signal into a progressive video signal.

One problem with the 2:2 pull-down field motion detector circuit is that sometimes the 2:2 pull-down field motion detector circuit falsely detects a 2:2 pull-down field pattern. As those of skill in the art will recognize, a direct difference between the consecutive fields cannot be used to generate the comparison values since there is a vertical spatial difference between the pixels in the consecutive fields. As such, more complex comparison techniques (e.g., techniques that use vertical high pass filters to compare the high frequencies within the consecutive fields) are used to compare the consecutive fields and thus generate the comparison values. Unfortunately, these comparison techniques are susceptible to falsely detecting a 2:2 pull-down field pattern. This is undesirable since the deinterlacer circuit merges the consecutive fields in the interlaced video signal when a 2:2 pull-down field pattern is falsely detected. Since the consecutive fields in the interlaced video signal are from different points in time and are merged, highly objectionable artifacts (i.e., feathering or combing) appear in the displayed image.

FIG. 2 illustrates the 3:2 pull-down technique. Using 3:2 pull-down, film frame A is converted into even interlaced video field A1, odd interlaced video field A2, and even interlaced video field A3 which is identical to field A1; film frame B is converted into odd interlaced video field B1 and even interlaced video field B2; film frame C is converted into odd interlaced video field C1, even interlaced video field C2, and odd interlaced video field C3 which is identical to field C1; film frame D is converted into even interlaced video field D1 and odd interlaced video field D2, and so on. Thus, using 3:2 pull-down 24 film frames are converted into 60 interlaced video fields every second.

When converting an interlaced video signal into a progressive video signal, it is desirable to determine whether the interlaced video signal was generated using 3:2 pull-down. This is because if the interlaced video signal was generated using 3:2 pull-down, the video deinterlacer can use the merging technique to merge consecutive fields (i.e., fields that were generated from the same film frame) to generate an essentially perfect progressive video signal.

Conventional video deinterlacer systems use a 3:2 pull-down frame motion detector circuit to determine whether an interlaced video signal was generated using 3:2 pull-down. The 3:2 pull-down frame motion detector circuit compares consecutive fields of the interlaced video signal having the same parity (i.e., two even fields or two odd fields) and generates a comparison value for each comparison. If a repeating 5 field sequence of 1 small comparison value followed by 4 consecutive large comparison values is detected, the 3:2 pull-down frame motion detector circuit generates a signal which indicates that the interlaced video signal was generated using 3:2 pull-down. Another signal is generated which indicates the 3:2 pull-down sequence. On the other hand, if a repeating 5 field sequence of 1 small comparison value followed by 4 large comparison values is not detected, the 3:2 pull-down frame motion detector circuit generates a signal which indicates that the interlaced video signal was not generated using 3:2 pull-down.

The technique employed by a conventional 3:2 pull-down frame motion detector circuit is illustrated by the following example. Suppose that an interlaced video signal has the following field sequence:

A1 A2 A3 B1 B2 C1 C2 C3 D1 D2 E1 E2 E3 F1 F2 G1 G2 G3 . . .

Fields A1, A2 and A3 were generated from film frame A; fields B1 and B2 were generated from film frame B; fields C1, C2, and C3 were generated from film frame C; fields D1 and D2 were generated from film frame D, and so on. The 3:2 pull-down frame motion detector circuit compares consecutive fields of the interlaced video signal having the same parity yielding a repeating pattern of 1 small comparison value followed by 4 consecutive large comparison values:

$A1-A3=CV1$ (which is a small difference)

$A2-B1=CV2$ (which is a large difference)

$A3-B2=CV3$ (which is a large difference)

$B1-C1=CV4$ (which is a large difference)

$B2-C2=CV5$ (which is a large difference)

$C1-C3=CV6$ (which is a small difference)

$C2-D1=CV7$ (which is a large difference)

$C3-D2=CV8$ (which is a large difference)

$D1-E1=CV9$ (which is a large difference)

D2−E2=CV10 (which is a large difference)

E1−E3=CV11 (which is a small difference)

E2−F1=CV12 (which is a large difference)

E3−F2=CV13 (which is a large difference)

F1−G1=CV14 (which is a large difference)

F2−G2=CV15 (which is a large difference)

G1−G3=CV16 (which is a small difference)

The 3:2 pull-down frame motion detector circuit detects this repeating 5 field sequence of 1 small comparison value followed by 4 consecutive large comparison values and generates a signal which indicates that the interlaced video signal was generated using 3:2 pull-down. If a repeating 5 field sequence of 1 small comparison value followed by 4 consecutive large comparison values is not detected, the 3:2 pull-down frame motion detector circuit generates a signal which indicates that the interlaced video signal was not generated using 3:2 pull-down.

The signal that indicates whether or not the interlaced video signal was generated using 3:2 pull-down is then provided to a deinterlacer circuit along with the interlaced video signal. If the indication signal indicates that the interlaced video signal was generated using 3:2 pull-down, the deinterlacer circuit uses the merging technique to convert the interlaced video signal into a progressive video signal. On the other hand, if the indication signal indicates that the interlaced video signal was not generated using 3:2 pull-down, the deinterlacer circuit typically uses a motion adaptive technique to convert the interlaced video signal into a progressive video signal.

Interlaced video signals that have been generated using 3:2 pull-down are often edited, for example, to insert a television commercial, to cut a scene out of a motion picture, to overlay computer graphics, or to overlay sub-titles, such as credits. Edits that do not occur on a film frame line result in what is commonly referred to as a "bad edit."

Some conventional video deinterlacers do not include the ability to detect bad edits. As a result, it can take up to 5 fields to detect the bad edit. This is illustrated by the following example. Suppose that an interlaced video signal has the following field sequence:

A1 A2 A3 B1 B2 C1 C2 C3 D1 D2 E1 E2 E3 F1 F2 G1 G2 G3 H1 H2 I1 I2 I3 . . .

Suppose further that the interlaced video signal is edited such that it includes a bad edit resulting in the following sequence:

A1 A2 A3 B1 B2 C1 C2 C3 D1 D2 E1 E2 E3 G3 H1 H2 I1 I2 I3 . . .

In this sequence, the bad edit occurs between fields E3 and G3. In other words, fields F1, F2, G1, and G2 have been edited out of the interlaced video signal. A conventional video deinterlacer circuit that does not have the ability to detect a bad edit compares consecutive fields of the interlaced video signal having the same parity yielding the following pattern of comparison values:

A1−A3=CV1 (which is a small difference)

A2−B1=CV2 (which is a large difference)

A3−B2=CV3 (which is a large difference)

B1−C1=CV4 (which is a large difference)

B2−C2=CV5 (which is a large difference)

C1−C3=CV6 (which is a small difference)

C2−D1=CV7 (which is a large difference)

C3−D2=CV8 (which is a large difference)

D1−E1=CV9 (which is a large difference)

D2−E2=CV10 (which is a large difference)

E1−E3=CV11 (which is a small difference)

E2−G3=CV12 (which is a large difference)

E3−H1=CV13 (which is a large difference)

G3−H2=CV14 (which is a large difference)

H1−I1=CV15 (which is a large difference)

H2−I2=CV16 (which is a large difference)

I1−I3=CV17 (which is a small difference)

This sequence of comparison values has an initial 10 comparison values which consist of 2 repeating sets of 5 field sequences of 1 small comparison value followed by 4 consecutive large comparison values. However, after this initial 10 comparison values, the sequence of comparison values ceases to have a 5 field sequence of 1 small comparison value followed by 4 consecutive large comparison values. Rather, the sequence now has 1 small comparison value followed by 5 consecutive large comparison values since it includes a bad edit. Unfortunately, conventional video deinterlacers cannot detect the bad edit until comparison value CV16 is generated. Since the conventional 3:2 pull-down motion detector circuit initially detects 3:2 pull-down, the video deinterlacer circuit continues to use the merging technique when generating the progressive video signal. After comparison value CV11, this causes fields from different points in time to be merged together when generating the progressive video signal and thus ultimately results in an image that includes highly objectionable artifacts (i.e., feathering or combing).

Some conventional video deinterlacers include bad edit detection circuits that can detect bad edits earlier using "look-ahead" techniques. A disadvantage with such look-ahead techniques is that they require up to six fields to be simultaneously stored in memory to detect bad edits. This requires a large amount of memory, which is expensive from both an implementation and a production standpoint and thus is undesirable.

Another technique used to detect 3:2 pull-down is to use a 3:2 pull-down field motion detector circuit. The 3:2 pull-down field motion detector circuit compares consecutive fields of the interlaced video signal having different parities yielding the following pattern:

A1−A2=CV1 (which is a small difference)

A2−A3=CV2 (which is a small difference)

A3−B1=CV3 (which is a large difference)

B1−B2=CV4 (which is a small difference)

B2−C1=CV5 (which is a large difference)

C1−C2=CV6 (which is a small difference)

$C2-C3=CV7$ (which is a small difference)

$C3-D1=CV8$ (which is a large difference)

$D1-D2=CV9$ (which is a small difference)

$D2-E1=CV10$ (which is a large difference)

$E1-E2=CV11$ (which is a small difference)

$E2-E3=CV12$ (which is a small difference)

$E3-F1=CV13$ (which is a large difference)

$F1-F2=CV14$ (which is a small difference)

$F2-G1=CV15$ (which is a large difference)

$G1-G2=CV16$ (which is a small difference)

The 3:2 pull-down field motion detector circuit detects the following repeating 5 field sequence: small difference, small difference, large difference, small difference, large difference. Bad edits can be fairly reliably detected using a 3:2 pull-down field motion detector circuit. However, 3:2 pull-down field motion detector circuits are problematic since often times they do not correctly detect when an interlaced video signal was generated using 3:2 pull-down.

Accordingly, what is needed are improved 2:2 pull-down and 3:2 pull-down detection techniques.

SUMMARY

The present invention provides improved 2:2 pull-down and 3:2 pull-down detection techniques.

According to one 2:2 pull-down detection technique of the present invention, a 2:2 pull-down field motion detector circuit receives an interlaced video signal and detects whether the interlaced video signal includes a 2:2 pull-down field pattern. The 2:2 pull-down field motion detector circuit accomplishes this by generating a comparison value for consecutive fields of an interlaced video signal having different parities, and detecting a sequence of 1 small comparison value followed by 1 large comparison value. Another signal is generated which indicates the sequence detected by the 2:2 pull-down field motion detector.

Additionally, a 2:2 pull-down frame motion detector circuit receives the interlaced video signal and detects whether the interlaced video signal includes a 2:2 pull-down frame pattern. The 2:2 pull-down frame motion detector circuit accomplishes this by generating a comparison value for consecutive fields of the interlaced video signal having the same parity, generating a difference value for consecutive comparison values, and detecting a sequence of 1 small difference value followed by 1 large difference value. In other words, the 2:2 pull-down frame motion detector circuit detects pairs of similar frame motion comparison values. Another signal is generated which indicates the sequence detected by the 2:2 pull-down frame motion detector.

If the 2:2 pull-down field motion detector circuit detects a 2:2 pull-down field pattern, and the 2:2 pull-down frame motion detector circuit detects a 2:2 pull-down frame pattern, and the 2:2 pull-down sequences detected by the field and frame motion detectors are the same, a signal is generated that indicates that the interlaced video signal was generated using 2:2 pull-down. If the 2:2 pull-down field motion detector circuit does not detect a 2:2 pull-down field pattern or the 2:2 pull-down frame motion detector circuit does not detect a 2:2 pull-down frame pattern, or the 2:2 pull-down sequences detected by the field and frame motion detectors are not the same, a signal is generated that indicates that the interlaced video signal was not generated using 2:2 pull-down.

According to one 3:2 pull-down detection technique of the present invention, a 3:2 pull-down frame motion detector circuit generates a comparison value for consecutive fields of an interlaced video signal having the same parity, and detects a sequence of 1 small comparison value followed by 2 pairs of similar large comparison values.

If a repeating 5 field sequence of 1 small comparison value followed by 2 pairs of similar large comparison values is detected, the 3:2 pull-down frame motion detector circuit generates a signal which indicates that the interlaced video signal was generated using 3:2 pull-down. Another signal is generated which indicates the sequence detected by the 3:2 pull-down frame motion detector. If a repeating 5 field sequence of 1 small comparison value followed by 2 pairs of similar large comparison values is not detected, the 3:2 pull-down frame motion detector circuit generates a signal which indicates that the interlaced video signal was not generated using 3:2 pull-down.

Other embodiments, aspects, and advantages of the present invention will become apparent from the following descriptions and the accompanying drawings. Other embodiments not specifically described in the following descriptions and/or shown in the accompanying drawings will also be apparent to those of ordinary skill in the art.

BRIEF DESCRIPTION OF THE DRAWINGS

For a more complete understanding of the present invention and for further embodiments, aspects, and advantages, reference is now made to the following descriptions taken in conjunction with the accompanying drawings in which.

DETAILED DESCRIPTION

Figure 1:
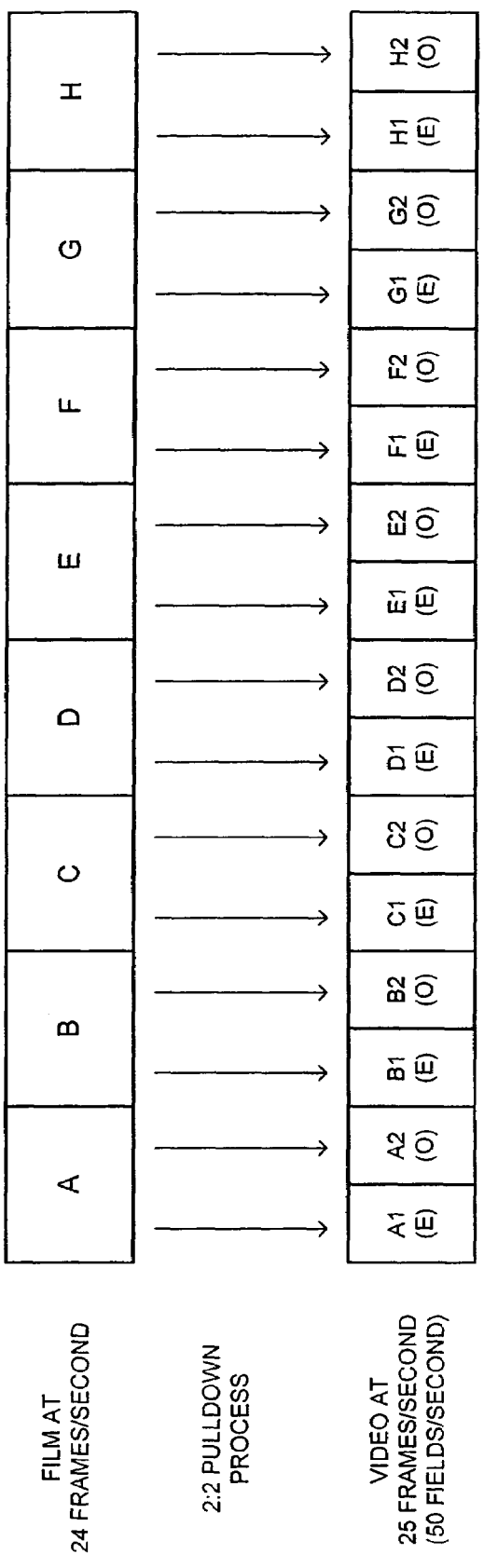
FIG. 1 is a diagram illustrating the 2:2 pull-down technique.
Figure 2:
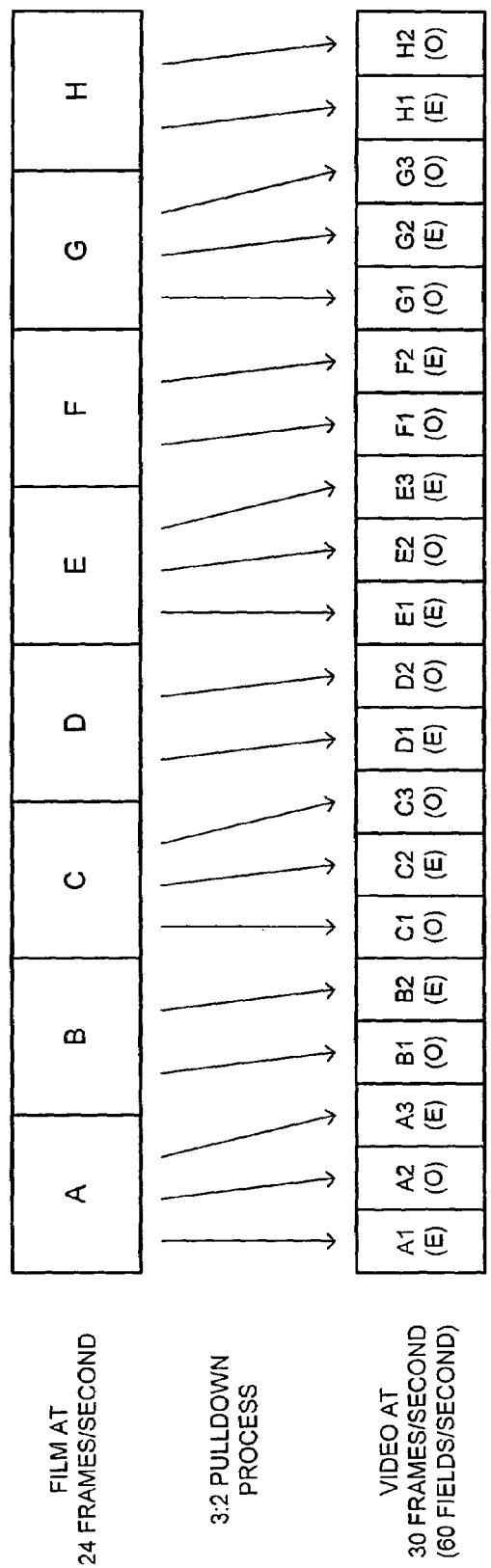
FIG. 2 is a diagram illustrating the 3:2 pull-down technique.

Certain embodiments of the present invention and their advantages are best understood by referring to the drawings. Like reference numerals are used for like and corresponding parts of the various drawings.

I. Video Deinterlacer System With Improved 2:2 Pull-Down Detection

Figure 3:
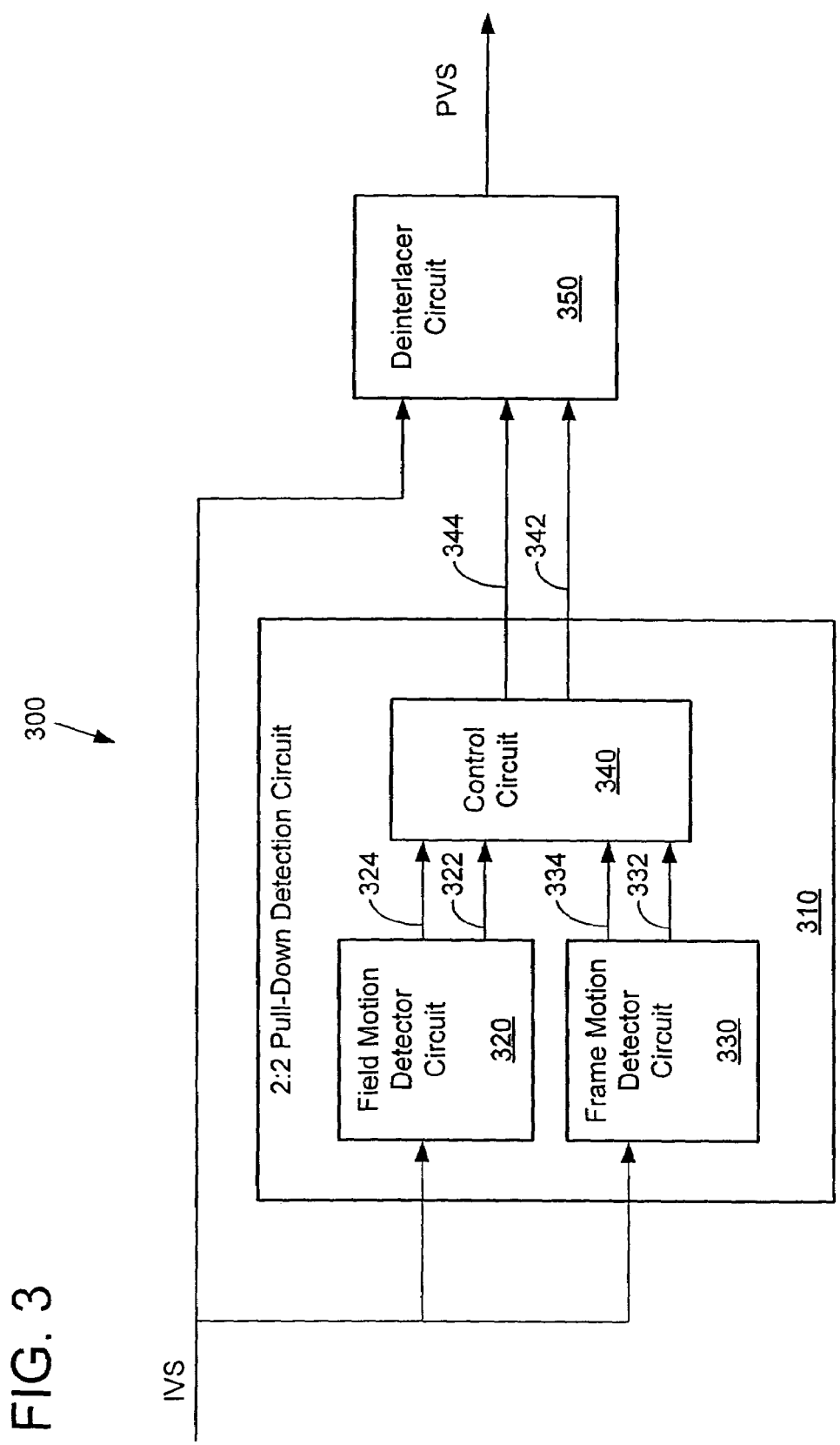
FIG. 3 is a block diagram of a video deinterlacer system that uses an improved 2:2 pull-down detection technique, according to some embodiments of the present invention.

FIG. 3 is a block diagram of a video deinterlacer system 300, according to some embodiments of the present invention. Video deinterlacer system 300 includes a 2:2 pull-down detection circuit 310 and a deinterlacer circuit 350. 2:2 pull-down detection circuit 310 includes a field motion detector circuit 320, a frame motion detector circuit 330, and a control circuit 340. The functions performed by video deinterlacer system 300 can be implemented using hardware, firmware/microcode, software, or any combination thereof. Video deinterlacer system 300 can also be implemented on a single integrated circuit device or on multiple integrated circuit devices.

2:2 pull-down field motion detector circuit 320, which can be any conventional 2:2 pull-down field motion detector circuit, receives interlaced video signal IVS and generates a signal (which is output on signal line 322) that indicates whether or not a 2:2 pull-down field pattern has been detected. If a 2:2 pull-down field pattern has been detected, another signal (which is output on signal line 324) is generated which indicates the 2:2 sequence. The 2:2 sequence signal on signal line 324 is a timing signal that allows deinterlacer circuit 350 to properly merge the fields of interlaced video signal IVS (e.g., so that fields A1 and A2 will be merged rather than fields A2 and B1). In particular, 2:2 pull-down field motion detector circuit 320 compares consecutive fields of interlaced video signal IVS having different parities and generates a comparison value for each comparison. If a 2:2 pull-down field pattern is detected by 2:2 pull-down field motion detector circuit, then 2:2 pull-down field motion detector circuit generates and outputs a signal on signal line 322 that indicates that a 2:2 pull-down pattern has been detected, and generates and outputs a signal on signal line 324 which indicates the 2:2 sequence. As used herein, a 2:2 pull-down field pattern is a repeating sequence of 1 small comparison value followed by 1 large comparison value. On the other hand, if a 2:2 pull-down field pattern is not detected by 2:2 pull-down field motion detector circuit, then 2:2 pull-down field motion detector circuit generates and outputs a signal on signal line 322 that indicates that a 2:2 pull-down pattern has not been detected. Since the operation of conventional 2:2 pull-down field detector circuits are well known, the operation of 2:2 pull-down field detector circuit 320 is not described any further herein.

As mentioned above, one problem with conventional 2:2 pull-down field motion detector circuits, such as 2:2 pull-down field motion detector circuit 320 is that they often falsely detect a 2:2 pull-down field pattern. As such, the merging technique is mistakenly used to generate the progressive video signal from the interlaced video signal that ultimately results in a displayed image that includes highly objectionable artifacts (i.e., feathering or combing). Applicant has discovered that this false detection problem can be substantially reduced or eliminated by using a frame motion detector circuit, such as 2:2 pull-down frame motion detector circuit 330, in addition to a 2:2 pull-down field motion detector circuit.

2:2 pull-down frame motion detector circuit 330 receives interlaced video signal IVS and generates a signal (which is output on signal line 332) that indicates whether or not a 2:2 pull-down frame pattern has been detected. If a 2:2 pull-down frame pattern has been detected, another signal (which is output on signal line 334) is generated which indicates the 2:2 sequence. The 2:2 sequence signal on signal line 334 is a timing signal that allows deinterlacer circuit 350 to properly merge the fields of interlaced video signal IVS (e.g., so that fields A1 and A2 will be merged rather than fields A2 and B1). In particular, frame motion detector circuit 330 compares consecutive fields having the same parity and generates a comparison value for each comparison. Consecutive comparison values are then compared to generate difference values. If a 2:2 pull-down frame pattern is detected by frame motion detector circuit 330, then frame motion detector circuit 330 generates and outputs a signal on signal line 332 that indicates that interlaced video signal IVS was generated using 2:2 pull-down, and generates and outputs a signal on signal line 334 which indicates the 2:2 sequence. As used herein, a 2:2 pull-down frame pattern is a repeating sequence of 1 small difference value followed by 1 large difference value. On the other hand, if a 2:2 pull-down frame pattern is not detected by frame motion detector circuit 330, then frame motion detector circuit 330 generates and outputs a signal on signal line 332 that indicates that interlaced video signal IVS was not generated using 2:2 pull-down.

The technique employed by 2:2 pull-down frame motion detector circuit 330 is illustrated by the following two examples. In the first example, suppose that interlaced video signal IVS was generated using 2:2 pull-down and has the following field sequence:

A1 A2 B1 B2 C1 C2 D1 D2 E1 E2 F1 F2. . .

2:2 pull-down frame motion detector circuit 330 compares consecutive fields having the same parity to generate comparison values. Thus, 2:2 pull-down frame motion detector circuit 330 compares fields A1 and B1. This comparison results in a first comparison value CV1. 2:2 pull-down frame motion detector circuit 330 then compares fields A2 and B2. This comparison results in a second comparison value CV2. 2:2 pull-down field motion detector circuit 330 then compares fields B1 and C1. This comparison results in a third comparison value CV3. 2:2 pull-down frame motion detector circuit 330 then compares fields B2 and C2. This results in a fourth comparison value CV4. 2:2 pull-down frame motion detector circuit 330 then compares fields C1 and D1. This results in a fifth comparison value CV5. 2:2 pull-down frame motion detector circuit 330 then compares fields C2 and D2. This results in a sixth comparison value CV6. This same process is performed as frame motion detector circuit 330 receives each new field. The comparisons and the resulting comparison values are as follows:

$A1-B1=CV1$ $A2-B2=CV2$ $B1-C1=CV3$ $B2-C2=CV4$ $C1-D1=CV5$ $C2-D2=CV6$ $D1-E1=CV7$ $D2-E2=CV8$ $E1-F1=CV9$ $E2-F2=CV10$ $F1-G1=CV11$

As each comparison value is generated, 2:2 pull-down frame motion detector circuit 330 compares the recently generated comparison value with the previously generated comparison value to generate a difference value. Thus, 2:2 pull-down frame motion detector circuit 330 compares comparison values CV1 and CV2. This comparison results in a first difference value DV1, which is a small difference since comparison values CV1 and CV2 were each generated by comparing fields that were generated from the same two film frames. 2:2 pull-down frame motion detector circuit 330 then compares comparison values CV2 and CV3. This comparison results in a second difference value DV2, which is a large difference since comparison values CV2 and CV3 were not generated by comparing fields that were generated from the same two film frames. 2:2 pull-down frame motion detector circuit 330 then compares comparison values CV3 and CV4. This comparison results in a third difference value DV3, which is a small difference since comparison values CV3 and CV4 were each generated by comparing fields that were generated from the same two film frames. 2:2 pull-down frame motion detector circuit 330 then compares comparison values CV4 and CV5. This comparison results in a fourth difference value DV4, which is a large difference since comparison values CV4 and CV5 were not generated by comparing fields that were generated from the same two film frames. 2:2 pull-down frame motion detector circuit 330 then compares comparison values CV5 and CV6. This comparison results in a fifth difference value DV5, which is a small difference since comparison values CV5 and CV6 were each generated by comparing fields that were generated from the same two film frames. The comparisons and the resulting difference values are as follows:

$CV1-CV2=DV1$ (which is a small difference)

$CV2-CV3=DV2$ (which is a large difference)

$CV3-CV4=DV3$ (which is a small difference)

$CV4-CV5=DV4$ (which is a large difference)

$CV5-CV6=DV5$ (which is a small difference)

Since the interlaced video signal was generated using 2:2 pull-down, the following pattern emerges: small difference value, large difference value, small difference value, large difference value, small difference value, and so on. As mentioned above, this repeating pattern of 1 small difference value followed by 1 large difference value is referred to herein as a 2:2 pull-down frame pattern. 2:2 pull-down frame motion detector circuit 330 detects this 2:2 pull-down frame pattern and generates and outputs a signal on signal line 332 that indicates that interlaced video signal IVS was generated using 2:2 pull-down and generates and outputs a signal on signal line 334 that indicates the 2:2 sequence.

Turning to the second example, suppose that interlaced video signal IVS was not generated using 2:2 pull-down and has the following field sequence:
A B C D E F G H I J . . .

2:2 pull-down frame motion detector circuit 330 compares consecutive fields having the same parity to generate comparison values. The comparisons and the resulting comparison values are as follows:

$A-C=CV1$ $B-D=CV2$ $C-E=CV3$ $D-F=CV4$ $E-G=CV5$ $F-H=CV6$

As each comparison value is generated, 2:2 pull-down frame motion detector circuit 330 compares the recently generated comparison value with the previously generated comparison value to generate a difference value. The comparisons and the resulting difference values are as follows:

$CV1-CV2=DV1$ (which is a large difference)

$CV2-CV3=DV2$ (which is a large difference)

$CV3-CV4=DV3$ (which is a large difference)

$CV4-CV5=DV4$ (which is a large difference)

$CV5-CV6=DV5$ (which is a large difference)

Since the comparison values (from which each difference value is generated) were not generated by comparing fields that were generated from the same two film frames, all of the difference values in this sequence are large difference values. Note that the difference values may be a random pattern of small or large difference values. Thus, a 2:2 pull-down frame pattern does not emerge, and 2:2 pull-down frame motion detector circuit 330 generates and outputs a signal on signal line 332 that indicates that interlaced video signal IVS was not generated using 2:2 pull-down.

Control circuit 340 receives two different pairs of signals. The first pair of signals includes the signal that indicates whether interlaced video signal IVS was generated using 2:2 pull-down on signal line 322 and the signal that indicates the 2:2 sequences on signal line 324. The second pair of signals includes the signal that indicates whether interlaced video signal IVS was generated using 2:2 pull-down on signal line 332 and the signal that indicates the 2:2 sequences on signal line 334.

Control circuit 340 compares the signals that indicate whether interlaced video signal IVS was generated using 2:2 pull-down (i.e., the signals on signal lines 322 and 332) and if they both indicate that interlaced video signal IVS was generated using 2:2 pull-down, control circuit 340 generates and outputs a signal on signal line 342 that causes deinterlacer circuit 350 to generate progressive video signal PVS from interlaced video signal IVS using the merging technique. Control circuit 340 also compares the signals that indicate the 2:2 sequence (i.e., the signals on signal lines 324 and 334) and if they both indicate the same 2:2 sequence, control circuit 340 generates and output a signal on signal line 344 that indicates the 2:2 sequence. The 2:2 sequence signal on signal line 344 is a timing signal that allows deinterlacer circuit 350 to properly merge the fields of interlaced video signal IVS (e.g., so that fields A1 and A2 will be merged rather than fields A2 and B1).

If, on the other hand, the two signals that indicate whether interlaced video signal IVS was generated using 2:2 pull-down (i.e., the signals on signal lines 322 and 332) do not both indicate that interlaced video signal IVS was generated using 2:2 pull-down, control circuit 340 generates and outputs a signal on signal line 342 that causes deinterlacer circuit 350 to generate progressive video signal PVS from interlaced video signal IVS using a motion adaptive technique, a motion-compensated technique, and/or an interpolation technique. Additionally, if the signals that indicate the 2:2 sequence (i.e., the signals on signal lines 324 and 334) do not both indicate the same 2:2 sequence, control circuit 340 can generate and output a signal on signal line 342 that causes deinterlacer circuit 350 to generate progressive video signal PVS from interlaced video signal IVS using a motion adaptive technique, a motion-compensated technique, and/or an interpolation technique.

In an alternative embodiment (not shown), control circuit 340 can be omitted and signal lines 322, 324, 332, and 334 can be connected directly to deinterlacer circuit 350. Deinterlacer circuit 350 can then perform the same functions that control circuit 340 performs as described above.

By using frame motion detector 330 in addition to field motion detector 320, the likelihood that a false 2:2 pull-down pattern will be detected is substantially reduced or eliminated. As such, progressive video signal PVS will not be erroneously generated from interlaced video signal IVS using the merging technique. Rather, a motion adaptive technique will be used to generate progressive video signal PVS in situations where field motion detector 320 may falsely detect a 2:2 pull-down field pattern. This ultimately results in a high quality progressive video signal that can be used to generate an image that is completely or substantially free from objectionable artifacts.

It is important to recognize that various modifications can be made to the present invention. For example, in one alternative embodiment, the 2:2 frame motion detector circuit detects whether every other difference value is a small difference value. If every other difference value is a small difference value, 2:2 pull-down frame motion detector circuit 330 detects this and generates and outputs a signal that indicates that interlaced video signal IVS was generated using 2:2 pull-down and a signal that indicates the 2:2 sequence. In this embodiment, the other difference values are treated as "don't cares."

The technique employed by 2:2 pull-down frame motion detector circuit of this alternative embodiment is illustrated by the following example. Suppose the interlaced video signal IVS was generated using 2:2 pull-down and has the following field sequence:

A1 A2 B1 B2 C1 C2 D1 D2 E1 E2 F1 F2 . . .

Comparison values are generated from the field sequences as described above, and then the following difference values are generated from the comparison values.

$CV1-CV2=DV1$ (which is a small difference)

$CV2-CV3=DV2$ (which is a don't care)

$CV3-CV4=DV3$ (which is a small difference)

$CV4-CV5=DV4$ (which is a don't care)

$CV5-CV6=DV5$ (which is a small difference)

The 2:2 frame motion detector circuit detects that every other difference value is a small difference and thus detects that the interlaced video signal was generated using 2:2 pull-down.

In another alternative embodiment, the 2:2 frame motion detector circuit initially detects a repeating sequence of 1 small difference value followed by 1 large difference value. After this initial sequence, which has a programmable duration, is detected, the 2:2 frame motion detector circuit then detects whether every other difference value is a small difference value. This detection process is similar to the detection process used by some 2:2 field motion detector circuits, which initially detect a repeating sequence of 1 small comparison value followed by 1 large comparison value. After this initial sequence is detected, the 2:2 field motion detector circuit then detects whether every other comparison value is a small comparison value.

Those of ordinary skill in the art will recognize that many different circuits can be used to perform the functions performed by 2:2 pull-down field motion detector circuit 320, 2:2 pull-down frame motion detector circuit 330, control circuit 340, and deinterlacer circuit 350 and that all such circuits are within the scope of the present invention. In addition to preventing the false detection of 2:2 pull-down, the technique of using both a field and a frame motion detector can be used to detect bad edits in a 2:2 sequence.

II. Video Deinterlacer System With Improved 3:2 Pull-Down Detection

As described above, conventional 3:2 pull-down frame motion detector circuits compare the difference between fields of the same parity and detect a repeating 5 field sequence of 1 small comparison value followed by 4 consecutive large comparison values to determine whether the interlaced video signal was generated using 3:2 pull-down. To detect bad edits, some conventional 3:2 pull-down frame motion detector circuits use look-ahead techniques, which require up to 6 fields to be stored in memory. This requires a large amount of memory, which is expensive from both an implementation and production standpoint. Applicant has discovered a technique that can be used to detect bad edits in interlaced video signals generated using 3:2 pull-down that only requires an economical 2 fields to be stored in memory at any given time.

Figure 4:
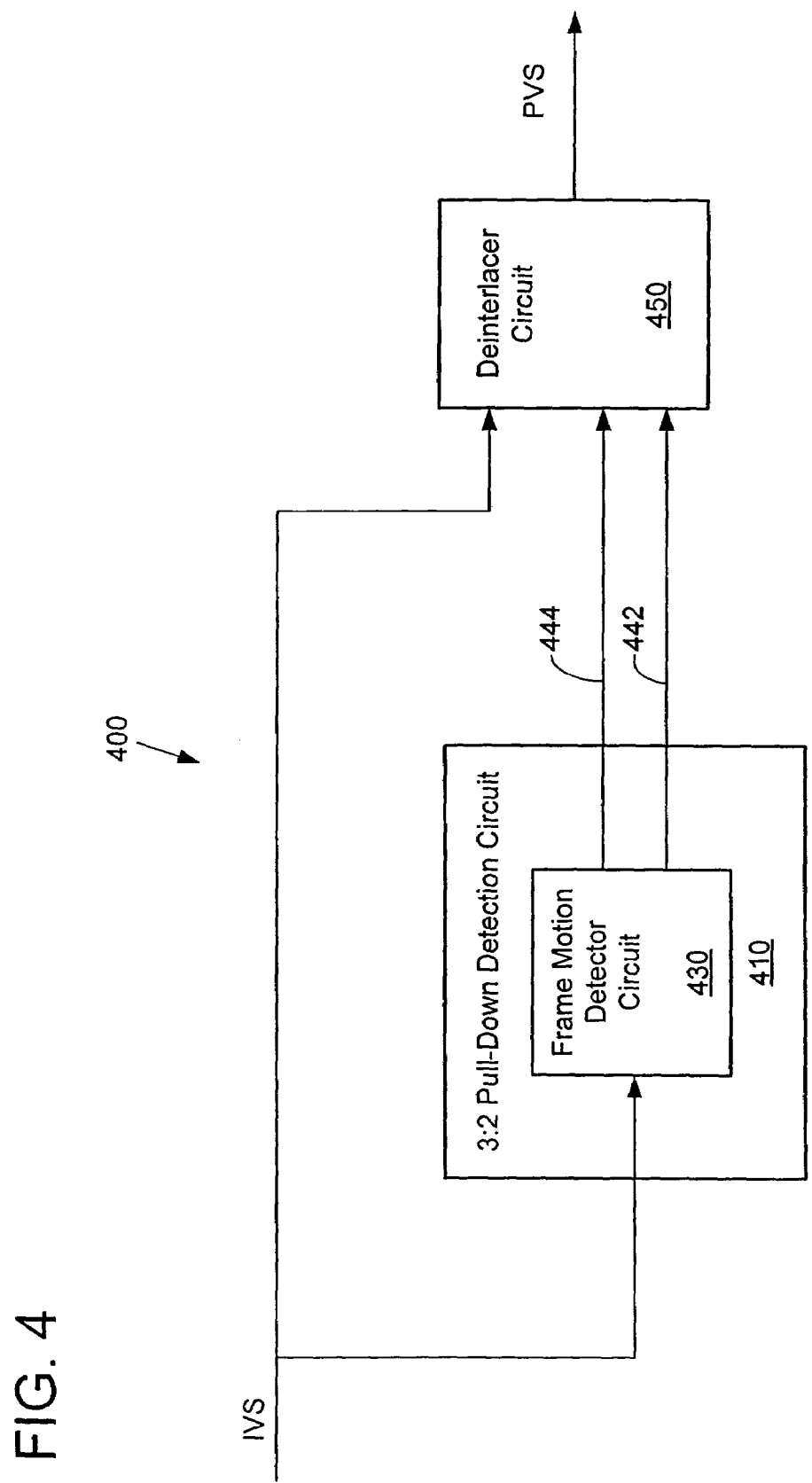
FIG. 4 is a block diagram of a video deinterlacer system that uses an improved 3:2 pull-down detection technique, according to some embodiments of the present invention.

FIG. 4 is a block diagram of a video deinterlacer system 400, according to some embodiments of the present invention. Video deinterlacer system 400 includes a 3:2 pull-down detection circuit 410 and a deinterlacer circuit 450. 3:2 pull-down detection circuit 410 includes a frame motion detector circuit 430. The functions performed by video deinterlacer system 400 can be implemented using hardware, firmware/microcode, software, or any combination thereof. Video deinterlacer system 400 can also be implemented on a single integrated circuit device or on multiple integrated circuit devices.

3:2 pull-down frame motion detector circuit 430 receives interlaced video signal IVS and generates a signal that indicates whether or not a 3:2 pull-down frame pattern has been detected. In particular, frame motion detector circuit 430 compares consecutive fields having the same parity and generates a comparison value for each comparison. Consecutive comparison values are analyzed to determine whether a repeating 5 field sequence of 1 small comparison value followed by 2 pairs of similar large comparison values exists. If this pattern is detected by frame motion detector circuit 430, then frame motion detector circuit 430 generates and outputs a signal (on signal line 442) that indicates that interlaced video signal IVS was generated using 3:2 pull-down, and generates and outputs a signal (on signal line 444) that indicates the 3:2 sequence. The 3:2 sequence signal on signal line 444 is a timing signal that allows deinterlacer circuit 450 to properly merge the fields of interlaced video signal IVS (e.g., so that fields A2 and A3 will be merged rather than fields A3 and B1). On the other hand, if this pattern is not detected by frame motion detector circuit 430, then frame motion detector circuit 430 generates and outputs a signal (on signal line 442) that indicates that interlaced video signal IVS was not generated using 3:2 pull-down.

The technique employed by 3:2 pull-down frame detector circuit 430 is illustrated by the following three examples. In the first example, suppose that interlaced video signal IVS was generated using 3:2 pull-down and does not include a bad edit. Interlaced video signal IVS has the following field sequence:

A1 A2 A3 B1 B2 C1 C2 C3 D1 D2 E1 E2 E3 F1 F2 G1 G2 G3 . . .

3:2 pull-down frame motion detector circuit 430 compares consecutive fields having the same parity to generate comparison values. Thus, 3:2 pull-down frame motion detector circuit 430 compares fields A1 and A3. This comparison results in a first comparison value CV1, which is a small difference since fields A1 and A3 were generated from the same film frame. 3:2 pull-down frame motion detector circuit 430 then compares fields A2 and B1. This comparison results in a second comparison value CV2, which is a large difference since fields A2 and B1 were generated from different film frames. 3:2 pull-down field motion detector circuit 430 then compares fields A3 and B2. This comparison results in a third comparison value CV3, which is a large difference since fields A3 and B2 were generated from different film frames. It is important to note that comparison value CV3 is similar to comparison value CV2 since they are both generated by comparing fields that were generated from the same two film frames. Thus, comparison values CV2 and CV3 make up a first pair of similar large comparison values. 3:2 pull-down frame motion detector circuit 430 then compares fields B1 and C1. This results in a fourth comparison value CV4, which is a large difference since fields B1 and C1 were generated from different film frames. 3:2 pull-down frame motion detector circuit 430 then compares fields B2 and C2. This results in a fifth comparison value CV5, which is a large difference since fields B2 and C2 were generated from different film frames. It is important to note that comparison value CV5 is similar to comparison value CV4 since they are both generated by comparing fields that were generated from the same two film frames. Thus, comparison values CV4 and CV5 make up a second pair of similar large comparison values. This same process is performed as frame motion detector circuit 430 receives each new field. The comparisons and the resulting comparison values are as follows:

$A1-A3=CV1$ (which is a small difference)

$A2-B1=CV2$ (which is a large difference)

$A3-B2=CV3$ (which is a large difference and is similar to CV2)

$B1-C1=CV4$ (which is a large difference)

$B2-C2=CV5$ (which is a large difference and is similar to CV4)

$C1-C3=CV6$ (which is a small difference)

$C2-D1=CV7$ (which is a large difference)

$C3-D2=CV8$ (which is a large difference and is similar to CV7)

$D1-E1=CV9$ (which is a large difference)

$D2-E2=CV10$ (which is a large difference and is similar to CV9)

$E1-E3=CV11$ (which is a small difference)

$E2-F1=CV12$ (which is a large difference)

$E3-F2=CV13$ (which is a large difference and is similar to CV12)

$F1-G1=CV14$ (which is a large difference)

$F2-G2=CV15$ (which is a large difference and is similar to CV14)

$G1-G3=CV16$ (which is a small difference)

Rather than detecting a repeating 5 field sequence of 1 small comparison value followed by 4 consecutive large comparison values as many conventional 3:2 pull-down frame motion detector circuits do, 3:2 pull-down frame motion detector circuit 430 detects a repeating 5 field sequence of 1 small comparison value followed by 2 pairs of similar large comparison values. If a repeating 5 field sequence of 1 small comparison value followed by 2 pairs of similar large comparison values is detected, 3:2 pull-down frame motion detector circuit 430 generates and outputs a signal on signal line 442 which indicates that the interlaced video signal was generated using 3:2 pull-down, and generates and outputs a signal on signal line 444 that indicates the 3:2 sequence. If a repeating 5 field sequence of 1 small comparison value followed by 2 pairs of similar large comparison values is not detected, the 3:2 pull-down frame motion detector circuit 430 generates and outputs a signal on signal line 442 which indicates that the interlaced video signal was not generated using 3:2 pull-down.

Turning to the second example, suppose that interlaced video signal IVS was generated using 3:2 pull-down and includes a bad edit. Interlaced video signal IVS has the following sequence:

A1 A2 A3 B1 B2 C1 C2 C3 D1 D2 E1 E2 E3 G3 H1 H2 I1 I2 I3 . . .

In this sequence, the bad edit occurs between fields E3 and G3. In other words, fields F1, F2, G1, and G2 have been edited out of the interlaced video signal. 3:2 pull-down frame motion detector circuit 430 compares consecutive fields having the same parity to generate comparison values. Thus, 3:2 pull-down frame motion detector circuit 430 compares fields A1 and A3. This comparison results in a first comparison value CV1. 3:2 pull-down frame motion detector circuit 430 then compares fields A2 and B1. This comparison results in a second comparison value CV2. 3:2 pull-down field motion detector circuit 430 then compares fields A3 and B2. This comparison results in a third comparison value CV3. This same process is performed as frame motion detector circuit 430 receives each new field. The comparisons and the resulting comparison values are as follows:

$A1-A3=CV1$ (which is a small difference)

$A2-B1=CV2$ (which is a large difference)

$A3-B2=CV3$ (which is a large difference and is similar to CV2)

$B1-C1=CV4$ (which is a large difference)

$B2-C2=CV5$ (which is a large difference and is similar to CV4)

$C1-C3=CV6$ (which is a small difference)

$C2-D1=CV7$ (which is a large difference)

$C3-D2=CV8$ (which is a large difference and is similar to CV7)

$D1-E1=CV9$ (which is a large difference)

$D2-E2=CV10$ (which is a large difference and is similar to CV9)

$E1-E3=CV11$ (which is a small difference)

$E2-G3=CV12$ (which is a large difference)

$E3-H1=CV13$ (which is a large difference and is not similar to CV12)

$G3-H2=CV14$ (which is a large difference)

$H1-I1=CV15$ (which is a large difference and is not similar to CV14)

$H2-I2=CV16$ (which is a large difference)

$I1-I3=CV17$ (which is a small difference)

In this case, 3:2 pull-down frame motion detector circuit 430 quickly detects a bad edit since a small comparison value (i.e., comparison value CV11) is followed by two dissimilar large comparison values (i.e., comparison value CV12 and CV13) rather than a pair of similar comparison values. It is important to note that comparison value CV13 is not similar to comparison value CV12 since they are not generated by comparing fields that were generated from the same two film frames. Since 3:2 pull-down frame motion detector circuit 430 does not detect a repeating 5 field sequence of 1 small comparison value followed by 2 pairs of similar large comparison values, 3:2 pull-down frame motion detector 430 generates and outputs a signal on signal line 442 that indicates that a bad edit has occurred. This signal is then output to deinterlacer circuit 450.

Turning to the third example, suppose that interlaced video signal IVS was not generated using 3:2 pull-down and has the following field sequence:
A B C D E F G H I J . . .

3:2 pull-down frame motion detector circuit 430 compares consecutive fields having the same parity to generate comparison values. The comparisons and the resulting comparison values are as follows:

$A-C=CV1$ (which is either a small or a large difference)

$B-D=CV2$ (which is a large difference and is not similar to CV1)

$C-E=CV3$ (which is either a small or a large difference and is not similar to CV2)

$D-F=CV4$ (which is either a small or a large difference and is not similar to CV3)

$E-G=CV5$ (which is either a small or a large difference and is not similar to CV4)

$F-H=CV6$ (which is either a small or a large difference and is not similar to CV5)

In this case, 3:2 pull-down frame motion detector circuit 430 quickly determines that the interlaced video signal was not generated using 3:2 pull-down since comparison values CV2 and CV3 are dissimilar. Since 3:2 pull-down frame motion detector circuit 430 does not detect a 5 field sequence of 1 small comparison value followed by 2 pairs of similar large comparison values, 3:2 pull-down frame motion detector 430 generates a signal that indicates that the interlaced video signal was not generated using 3:2 pull-down. 3:2 pull-down frame motion detector 430 continues to generate the signal that indicates that the interlaced video signal was not generated using 3:2 pull-down, as long as the received field pattern is random.

If the signal generated by frame motion detector 430 (on signal line 442) indicates that the interlaced video signal IVS was generated using 3:2 pull-down, deinterlacer circuit 450 generates progressive video signal PVS from interlaced video signal IVS using the merging technique. If, on the other hand, the signal generated by frame motion detector 430 (on signal line 442) indicates that the interlaced video signal IVS was not generated using 3:2 pull-down, deinterlacer circuit 450 generates progressive video signal PVS from interlaced video signal IVS using a motion adaptive technique, a motion-compensated technique, or an interpolation technique.

By detecting a repeating 5 field sequence of 1 small comparison value followed by 2 pairs of similar large comparison values to determine whether the interlaced video signal was generated using 3:2 pull-down, frame motion detector system 400 can quickly detect bad edits while only needing to store an economical 2 fields of video.

It is important to recognize that various modifications can be made to the present invention. For example, in one alternative embodiment, the 3:2 frame motion detector circuit initially detects a repeating 5 field sequence of 1 small comparison value followed by 2 pairs of similar large comparison values. After this initial sequence, which has a programmable duration, is detected, the 3:2 frame motion detector circuit then detects a repeating 5 field sequence of 1 small comparison value followed by 2 pairs of similar comparison values. These pairs of comparison values may either have large or small values. This embodiment is advantageous in situations where an interlaced video signal is generated using 3:2 pull-down, but has very little motion from frame-to-frame. In these situations, it is desirable to continue to use the merging technique to generate the progressive video signal.

The technique employed by 3:2 pull-down frame motion detector circuit of this alternative embodiment is illustrated by the following example. Suppose the interlaced video signal IVS was generated using 3:2 pull-down and has the following field sequence:
A1 A2 A3 B1 B2 C1 C2 C3 D1 D2 E1 E2 E3 F1 F2 G1 G2 G3 . . .

Comparison values are generated as follows:

$A1-A3=CV1$ (which is a small difference)

$A2-B1=CV2$ (which is a large difference)

$A3-B2=CV3$ (which is a large difference and is similar to CV2)

$B1-C1=CV4$ (which is a large difference)

$B2-C2=CV5$ (which is a large difference and is similar to CV4)

$C1-C3=CV6$ (which is a small difference)

$C2-D1=CV7$ (which is a large difference)

$C3-D2=CV8$ (which is a large difference and is similar to CV7)

$D1-E1=CV9$ (which is a large difference)

$D2-E2=CV10$ (which is a large difference and is similar to CV9)

$E1-E3=CV11$ (which is a small difference)

$E2-F1=CV12$ (which is a large or a small difference)

$E3-F2=CV13$ (which is a large or a small difference and is similar to CV12)

$F1-G1=CV14$ (which is a large or a small difference)

$F2-G2=CV15$ (which is a large or a small difference and is similar to CV14)

$G1-G3=CV16$ (which is a small difference)

Applicant has discovered that, in some cases, such as when an interlaced video signal is generated from computer images, a repeating 5 field sequence of 1 small comparison value followed by 2 pairs of similar large comparison values will not emerge even though the interlaced video signal was generated using 3:2 pull-down. To address these cases, a second and/or third 3:2 pull-down frame motion detector circuit can be used. The second 3:2 frame motion detector circuit detects a repeating 5 field sequence of 1 small comparison value followed by a pair of dissimilar large comparison values and then followed by a pair of similar large comparison values to determine whether the interlaced video signal was generated using 3:2 pull-down. The third 3:2 frame motion detector circuit detects a repeating 5 field sequence of 1 small comparison value followed by a pair of similar large comparison values and then followed by dissimilar large comparison values to determine whether the interlaced video signal was generated using 3:2 pull-down.

The technique employed by the second 3:2 pull-down frame motion detector circuit is illustrated by the following example. Suppose the interlaced video signal IVS was generated using 3:2 pull-down and has the following field sequence:

A1 A2 A3 B1 B2 C1 C2 C3 D1 D2 E1 E2 E3 F1 F2 G1 G2 G3 . . .

Comparison values are generated as follows:

$A1-A3=CV1$ (which is a small difference)

$A2-B1=CV2$ (which is a large difference)

$A3-B2=CV3$ (which is a large difference and is not similar to CV2)

$B1-C1=CV4$ (which is a large difference)

$B2-C2=CV5$ (which is a large difference and is similar to CV4)

$C1-C3=CV6$ (which is a small difference)

$C2-D1=CV7$ (which is a large difference)

$C3-D2=CV8$ (which is a large difference and is not similar to CV7)

$D1-E1=CV9$ (which is a large difference)

$D2-E2=CV10$ (which is a large difference and is similar to CV9)

$E1-E3=CV11$ (which is a small difference)

$E2-F1=CV12$ (which is a large difference)

$E3-F2=CV13$ (which is a large difference and is not similar to CV12)

$F1-G1=CV14$ (which is a large difference)

$F2-G2=CV15$ (which is a large difference and is similar to CV14)

$G1-G3=CV16$ (which is a small difference)

The technique employed by the third 3:2 pull-down frame motion detector circuit is illustrated by the following example. Suppose the interlaced video signal IVS was generated using 3:2 pull-down and has the following field sequence:

A1 A2 A3 B1 B2 C1 C2 C3 D1 D2 E1 E2 E3 F1 F2 G1 G2 G3 . . .

Comparison values are generated as follows:

$A1-A3=CV1$ (which is a small difference)

$A2-B1=CV2$ (which is a large difference)

$A3-B2=CV3$ (which is a large difference and is similar to CV2)

$B1-C1=CV4$ (which is a large difference)

$B2-C2=CV5$ (which is a large difference and is not similar to CV4)

$C1-C3=CV6$ (which is a small difference)

$C2-D1=CV7$ (which is a large difference)

$C3-D2=CV8$ (which is a large difference and is similar to CV7)

$D1-E1=CV9$ (which is a large difference)

$D2-E2=CV10$ (which is a large difference and is not similar to CV9)

$E1-E3=CV11$ (which is a small difference)

$E2-F1=CV12$ (which is a large difference)

$E3-F2=CV13$ (which is a large difference and is similar to CV12)

$F1-G1=CV14$ (which is a large difference)

$F2-G2=CV15$ (which is a large difference and is not similar to CV14)

$G1-G3=CV16$ (which is a small difference)

Applicant has also discovered that bad edit detection can be improved by also using a 3:2 pull-down field motion detector circuit in addition to the 3:2 pull-down frame motion detector circuit. The 3:2 pull-down field motion detector circuit compares consecutive fields of the interlaced video signal having different parities and detects a repeating 5 field sequence of a pair of small comparison values, followed by a "don't care" comparison value, followed by a small comparison value, followed by a "don't care" comparison value.

The technique employed by 3:2 pull-down field motion detector circuit of this alternative embodiment is illustrated by the following example. Suppose the interlaced video signal IVS was generated using 3:2 pull-down and has the following field sequence:

A1 A2 A3 B1 B2 C1 C2 C3 D1 D2 E1 E2 E3 F1 F2 G1 G2 G3 . . .

The 3:2 frame motion detector then generates comparison values as follows:

$A1-A3=CV1$ (which is a small difference)

$A2-B1=CV2$ (which is a large difference)

$A3-B2=CV3$ (which is a large difference and is similar to CV2)

$B1-C1=CV4$ (which is a large difference)

$B2-C2=CV5$ (which is a large difference and is similar to CV4)

$C1-C3=CV6$ (which is a small difference)

$C2-D1=CV7$ (which is a large difference)

$C3-D2=CV8$ (which is a large difference and is similar to CV7)

$D1-E1=CV9$ (which is a large difference)

$D2-E2=CV10$ (which is a large difference and is similar to CV9)

$E1-E3=CV11$ (which is a small difference)

$E2-F1=CV12$ (which is a large difference)

$E3-F2=CV13$ (which is a large difference and is similar to CV12)

$F1-G1=CV14$ (which is a large difference)

$F2-G2=CV15$ (which is a large difference and is similar to CV14)

$G1-G3=CV16$ (which is a small difference)

The 3:2 field motion detector must then generate comparisons values as follows:

$A1-A2=CV1$ (which is a small difference)

$A2-A3=CV2$ (which is a small difference)

$A3-B1=CV3$ (which is a don't care)

$B1-B2=CV4$ (which is a small difference)

$B2-C1=CV5$ (which is a don't care)

$C1-C2=CV6$ (which is a small difference)

$C2-C3=CV7$ (which is a small difference)

$C3-D1=CV8$ (which is a don't care)

$D1-D2=CV9$ (which is a small difference)

$D2-E1=CV10$ (which is a don't care)

$E1-E2=CV11$ (which is a small difference)

$E2-E3=CV12$ (which is a small difference)

$E3-F1=CV13$ (which is a don't care)

$F1-F2=CV14$ (which is a small difference)

$F2-G1=CV15$ (which is a don't care)

$G1-G2=CV16$ (which is a small difference)

Those of ordinary skill in the art will recognize that many different circuits can be used to perform the functions performed by 3:2 pull-down frame motion detector circuit 430 and deinterlacer circuit 450 and that all such circuits are within the scope of the present invention.

III. Exemplary Applications

The improved 2:2 pull-down and 3:2 pull-down detection techniques of the present invention can be utilized in a wide variety of video signal processing applications. In one application, the 2:2 pull-down detection technique and/or the 3:2 pull-down detection technique of the present invention can be implemented in a single integrated circuit device that is used to convert an interlaced video signal into a progressive video signal. The integrated circuit device can be integrated into a digital video disc (DVD) player, a DVD recorder, a computer graphics controller, or an LCD panel controller. In another application, the 2:2 pull-down detection technique and/or the 3:2 pull-down detection technique of the present invention can be implemented in the firmware of a computer processor, such as a CPU, a DSP, or a media processor, that is used to convert an interlaced video signal into a progressive video signal. The 2:2 pull-down detection technique and/or the 3:2 pull-down detection technique of the present invention can also be used in a wide variety of digital video compression applications, a wide variety of digital video transmission applications, in progressive-scan TVs, in high definition televisions (HDTVs), and in LCD panels. Furthermore, the 2:2 pull-down detection technique and/or the 3:2 pull-down detection technique of the present invention can be implemented in software for such applications as software based DVD decoders used in computers and/or video game consoles.

IV. Alternative Embodiments

Those of ordinary skill in the art will recognize that numerous changes and modifications can be made to the 2:2 pull-down and 3:2 pull-down detection techniques of the present invention that have been described herein and that the appended claims encompass within their scope all such changes and modifications as fall within the true spirit of this invention.

What is claimed is:

1. A method for determining whether an interlaced video signal was generated using 2:2 pull-down, the method comprising:
   determining in a pull-down detection circuit whether the interlaced video signal includes two or more characteristics;
   generating in the pull-down detection circuit a first signal that indicates a 2:2 sequence if the interlaced video signal includes a first characteristic;
   generating in the pull-down detection circuit a second signal that indicates a 2:2 sequence if the interlaced video signal includes a second characteristic; and
   generating in a deinterlacer circuit a progressive video signal from the interlaced video signal using a merging technique if the interlaced video signal includes the first characteristic and the second characteristic and the first and second signals indicate the same 2:2 sequence.

2. The method of claim 1, wherein the first characteristic is a 2:2 pull-down field pattern and the second characteristic is a 2:2 pull-down frame pattern.

3. The method of claim 2, wherein determining whether the interlaced video signal includes a 2:2 pull-down field pattern comprises:
   generating a comparison value for consecutive fields of an interlaced video signal having different parities; and
   detecting a sequence of one small comparison value followed by one large comparison value.

4. The method of claim 2, wherein determining whether the interlaced video signal includes a 2:2 pull-down frame pattern comprises:
   generating comparison values using consecutive fields of the interlaced video signal having the same parity;
   generating difference values using consecutive comparison values; and
   detecting a sequence of one small difference value followed by one large difference value.

5. The method of claim 2, wherein determining whether the interlaced video signal includes a 2:2 pull-down frame pattern comprises:
   generating comparison values using consecutive fields of the interlaced video signal having the same parity;
   generating difference values using consecutive comparison values; and
   detecting whether every other difference value is a small difference value.

6. The method of claim 1, wherein determining whether the interlaced video signal includes a second characteristic comprises:
- generating comparison values using consecutive fields of an interlaced video signal having the same parity;
- generating difference values using consecutive comparison values; and
- detecting a sequence of one small difference value followed by one large difference value.

7. The method of claim 6, wherein generating comparison values using consecutive fields of an interlaced video signal having the same parity comprises:
- generating comparison values using consecutive even fields of the interlaced video signal; and
- generating comparison values using consecutive odd fields of the interlaced video signal.

8. The method of claim 1, wherein determining whether the interlaced video signal includes a second characteristic comprises:
- generating comparison values using consecutive fields of an interlaced video signal having the same parity;
- generating difference values using consecutive comparison values; and
- determining whether every other difference value is a small difference value.

9. The method of claim 8, wherein generating comparison values using consecutive fields of an interlaced video signal having the same parity comprises:
- generating comparison values using consecutive even fields of the interlaced video signal; and
- generating comparison values using consecutive odd fields of the interlaced video signal.

10. The method of claim 1, wherein determining whether the interlaced video signal includes a first characteristic comprises:
- detecting an initial sequence of one small difference value followed by one large difference value; and
- if the initial sequence is detected, detecting whether every other difference value is a small difference value.

11. The method of claim 10, further comprising:
- generating comparison values using consecutive even fields of the interlaced video signal;
- generating comparison values using consecutive odd fields of the interlaced video signal; and
- generating difference values using consecutive comparison values.

12. The method of claim 10, wherein the length of time that the initial sequence is detected has a programmable duration.

13. A method for determining whether an interlaced video signal was generated using 2:2 pull-down, the method comprising:
- determining in a pull-down detection circuit whether the interlaced video signal includes two or more characteristics;
- generating in the pull-down detection circuit a first signal that indicates a 2:2 sequence if the interlaced video signal includes a first characteristic;
- generating in the pull-down detection circuit a second signal that indicates a 2:2 sequence if the interlaced video signal includes a second characteristic; and
- generating in a deinterlacer circuit a progressive video signal from the interlaced video signal using a motion adaptive technique, a motion compensated technique, or an interpolation technique if the interlaced video signal does not include the first characteristic or the interlaced video signal does not include the second characteristic or if the first and second signals do not indicate the same 2:2 sequence.

14. The method of claim 13, wherein the first characteristic is a 2:2 pull-down field pattern and the second characteristic is a 2:2 pull-down frame pattern.

15. The method of claim 14 wherein determining whether the interlaced video signal includes a 2:2 pull-down field pattern comprises:
- generating a comparison value for consecutive fields of an interlaced video signal having different parities; and
- detecting a sequence of one small comparison value followed by one large comparison value.

16. The method of claim 14 wherein determining whether the interlaced video signal includes a 2:2 pull-down frame pattern comprises:
- generating comparison values using consecutive fields of the interlaced video signal having the same parity;
- generating difference values using consecutive comparison values; and
- detecting a sequence of one small difference value followed by one large difference value.

17. The method of claim 14 wherein determining whether the interlaced video signal includes a 2:2 pull-down frame pattern comprises:
- generating comparison values using consecutive fields of the interlaced video signal having the same parity;
- generating difference values using consecutive comparison values; and
- detecting whether every other difference value is a small difference value.

18. The method of claim 13, wherein determining whether the interlaced video signal includes a second characteristic comprises:
- generating comparison values using consecutive fields of an interlaced video signal having the same parity;
- generating difference values using consecutive comparison values; and
- detecting a sequence of one small difference value followed by one large difference value.

19. The method of claim 18, wherein generating comparison values using consecutive fields of an interlaced video signal having the same parity comprises:
- generating comparison values using consecutive even fields of the interlaced video signal; and
- generating comparison values using consecutive odd fields of the interlaced video signal.

20. The method of claim 13, wherein determining whether the interlaced video signal includes a second characteristic comprises:
- generating comparison values using consecutive fields of an interlaced video signal having the same parity;
- generating difference values using consecutive comparison values; and
- determining whether every other difference value is a small difference value.

21. The method of claim 20, wherein generating comparison values using consecutive fields of an interlaced video signal having the same parity comprises:
- generating comparison values using consecutive even fields of the interlaced video signal; and
- generating comparison values using consecutive odd fields of the interlaced video signal.

22. The method of claim 13, wherein determining whether the interlaced video signal includes a first characteristic comprises:

detecting an initial sequence of one small difference value followed by one large difference value; and if the initial sequence is detected, detecting whether every other difference value is a small difference value.

23. The method of claim 22, further comprising:

generating comparison values using consecutive even fields of the interlaced video signal;

generating comparison values using consecutive odd fields of the interlaced video signal; and generating difference values using consecutive comparison values.

24. The method of claim 22, wherein the length of time that the initial sequence is detected has a programmable duration.

25. A system for determining whether the interlaced video signal was generated using 2:2 pull-down, the circuit comprising:

a field motion detector circuit coupled to receive an interlaced video signal and operable to detect a 2:2 pull-down field pattern in the interlaced video signal, generate a signal indicating whether a 2:2 pull-down field pattern has been detected in the interlaced video signal, and generate a first signal indicating a 2:2 sequence if a 2:2 pull-down field pattern has been detected;

a frame motion detector circuit coupled to receive the interlaced video signal and operable to detect a 2:2 pull-down frame pattern in the interlaced video signal, generate a signal indicating whether a 2:2 pull-down frame pattern has been detected in the interlaced video signal, generate a second signal indicating the 2:2 sequence if a 2:2 pull-down frame pattern has been detected;

a control circuit coupled to receive the first signal from the field motion detector circuit and the second signal from the frame motion detector circuit; and a deinterlacer circuit coupled to receive a third signal from the control circuit, wherein the deinterlacer circuit uses a merging technique to generate a progressive video signal from the interlaced video signal if the third signal indicates that the interlaced video signal was generated using 2:2 pull-down.

26. A system for determining whether the interlaced video signal was generated using 2:2 pull-down, the circuit comprising:

a field motion detector circuit coupled to receive an interlaced video signal and operable to detect a 2:2 pull-down field pattern in the interlaced video signal, generate a signal indicating whether a 2:2 pull-down field pattern has been detected in the interlaced video signal, and generate a first signal indicating a 2:2 sequence if a 2:2 pull-down field pattern has been detected;

a frame motion detector circuit coupled to receive the interlaced video signal and operable to detect a 2:2 pull-down frame pattern in the interlaced video signal, generate a signal indicating whether a 2:2 pull-down frame pattern has been detected in the interlaced video signal, generate a second signal indicating the 2:2 sequence if a 2:2 pull-down frame pattern has been detected; and a deinterlacer circuit coupled to receive the first signal from the field motion detector circuit and the second signal from the frame motion detector circuit, wherein the deinterlacer circuit uses a merging technique to generate a progressive video signal from the interlaced video signal if the first signal and the second signal indicate that the interlaced video signal was generated using 2:2 pull-down.

27. A system for determining whether the interlaced video signal was generated using 2:2 pull-down, the circuit comprising:

a field motion detector circuit coupled to receive an interlaced video signal and operable to detect a 2:2 pull-down field pattern in the interlaced video signal, generate a signal indicating whether a 2:2 pull-down field pattern has been detected in the interlaced video signal, and generate a first signal indicating a 2:2 sequence if a 2:2 pull-down field pattern has been detected;

a frame motion detector circuit coupled to receive the interlaced video signal and operable to detect a 2:2 pull-down frame pattern in the interlaced video signal, generate a signal indicating whether a 2:2 pull-down frame pattern has been detected in the interlaced video signal, generate a second signal indicating the 2:2 sequence if a 2:2 pull-down frame pattern has been detected;

a control circuit coupled to receive the first signal from the field motion detector circuit and the second signal from the frame motion detector circuit; and a deinterlacer circuit coupled to receive a third signal from the control circuit, wherein the deinterlacer circuit uses a motion adaptive technique, a motion compensated technique, or an interpolation technique to generate a progressive video signal from the interlaced video signal if the third signal does not indicate that the interlaced video signal was generated using 2:2 pull-down.

28. A system for determining whether the interlaced video signal was generated using 2:2 pull-down, the circuit comprising:

a field motion detector circuit coupled to receive an interlaced video signal and operable to detect a 2:2 pull-down field pattern in the interlaced video signal, generate a signal indicating whether a 2:2 pull-down field pattern has been detected in the interlaced video signal, and generate a first signal indicating a 2:2 sequence if a 2:2 pull-down field pattern has been detected;

a frame motion detector circuit coupled to receive the interlaced video signal and operable to detect a 2:2 pull-down frame pattern in the interlaced video signal, generate a signal indicating whether a 2:2 pull-down frame pattern has been detected in the interlaced video signal, generate a second signal indicating the 2:2 sequence if a 2:2 pull-down frame pattern has been detected; and a deinterlacer circuit coupled to receive the first signal from the field motion detector circuit and the second signal from the frame motion detector circuit, wherein the deinterlacer circuit uses a motion adaptive technique, a motion compensated technique, or an interpolation technique to generate a progressive video signal from the interlaced video signal if the first signal does not indicate that the interlaced video signal was generated using 2:2 pull-down or the second signal does not indicate that the interlaced video signal was generated using 2:2 pull-down.

\* \* \* \* \*

UNITED STATES PATENT AND TRADEMARK OFFICE
CERTIFICATE OF CORRECTION

PATENT NO. : 7,612,829 B2  Page 1 of 1
APPLICATION NO. : 11/226581
DATED : November 3, 2009
INVENTOR(S) : Wing-Chi Chow It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 52 days.

Signed and Sealed this

Nineteenth Day of October, 2010

David J. Kappos
*Director of the United States Patent and Trademark Office*